(12) United States Patent
Grandpierre et al.

(10) Patent No.: US 7,257,331 B2
(45) Date of Patent: Aug. 14, 2007

(54) SIGNAL EMITTER FOR OPTICAL FIBERS

(75) Inventors: Georges Grandpierre, Arpajon (FR); Roland Uhel, Clohars Carnoet (FR)

(73) Assignee: Alcatel, Paris (FR)

( * ) Notice: Subject to any disclaimer, the term of this patent is extended or adjusted under 35 U.S.C. 154(b) by 530 days.

(21) Appl. No.: 10/206,959

(22) Filed: Jul. 30, 2002

(65) Prior Publication Data
US 2003/0035185 A1   Feb. 20, 2003

(30) Foreign Application Priority Data
Aug. 2, 2001   (FR) .................................. 01 10384

(51) Int. Cl.
*H04B 10/04* (2006.01)
*H04B 10/12* (2006.01)
(52) U.S. Cl. ...................... 398/186; 398/201
(58) Field of Classification Search ......... 398/182–201
See application file for complete search history.

(56) References Cited

U.S. PATENT DOCUMENTS 6,097,525 A * 8/2000 Ono et al. ................. 398/185
6,407,845 B2 * 6/2002 Nakamoto .................. 359/239
6,563,623 B1 * 5/2003 Penninckx et al. ......... 398/188
6,594,407 B2 * 7/2003 Doi et al. ....................... 385/2
6,763,197 B1 * 7/2004 Hirano et al. ............... 398/192
2003/0147656 A1 * 8/2003 Yano .......................... 398/186

FOREIGN PATENT DOCUMENTS

EP          0975107 A1      1/2000

OTHER PUBLICATIONS

A. Hirano et al., "40 Gbit/s L-band transmission experiment using SPM-tolerant carrier-suppressed RZ format", Electronic Letters, 1999, vol. 35, pp. 2213-2215.*
Patent Abstracts of Japan, vol. 1999, No. 1, Jan. 29, 1999 corresponding to JP 10 285144 A (Kokusai Denshin Denwa Co Ltd ..) Oct. 23, 1998.

* cited by examiner

*Primary Examiner*—Jason Chan
*Assistant Examiner*—Quan-Zhen Wang
(74) *Attorney, Agent, or Firm*—Sughrue Mion, PLLC

(57) ABSTRACT

An emitter of optical signals for optical fibers includes an electroabsorption modulator downstream of a laser and a Mach-Zhender modulator downstream of the electroabsorption modulator and controlled by at least one clock to eliminate for each pulse of the resulting signal from the first modulator a portion of signal in a time range including the rising edge and in a time range including the falling edge.

6 Claims, 2 Drawing Sheets

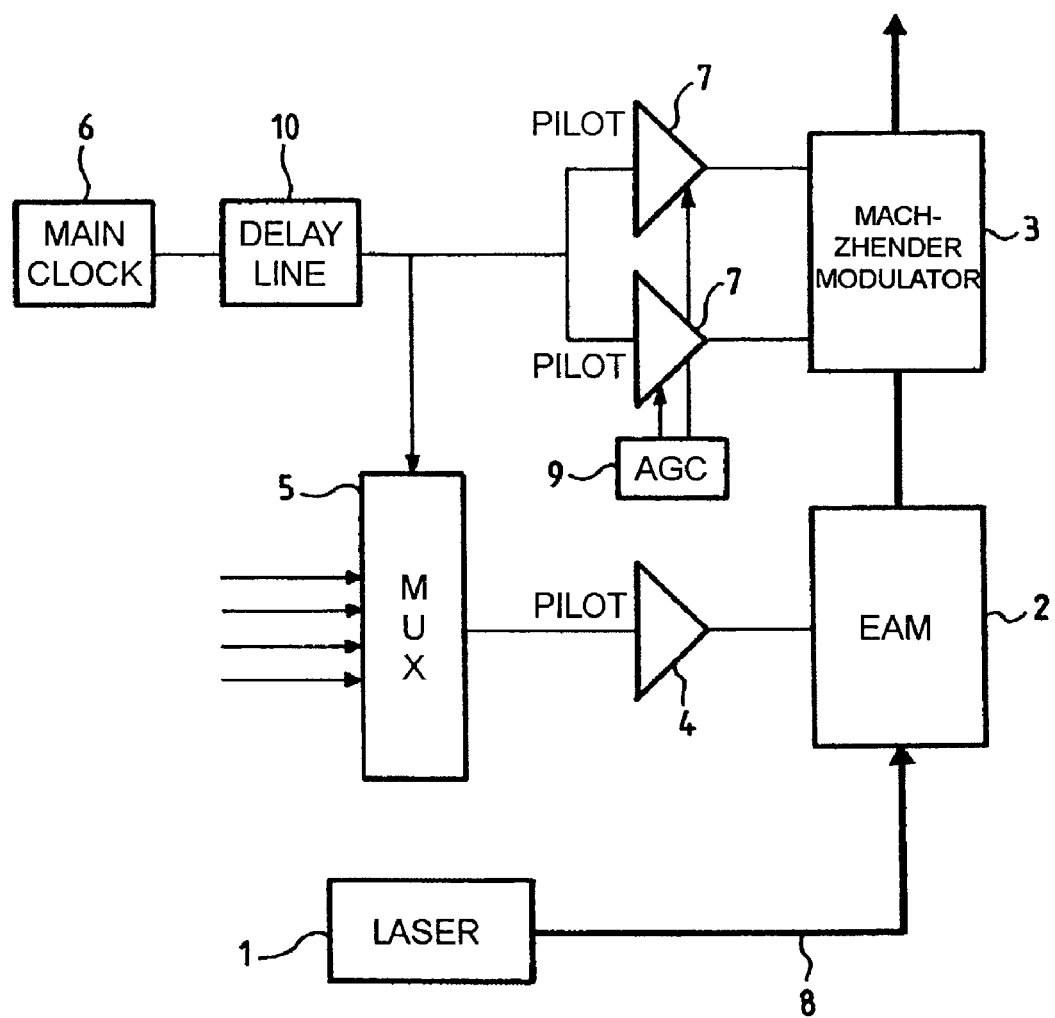

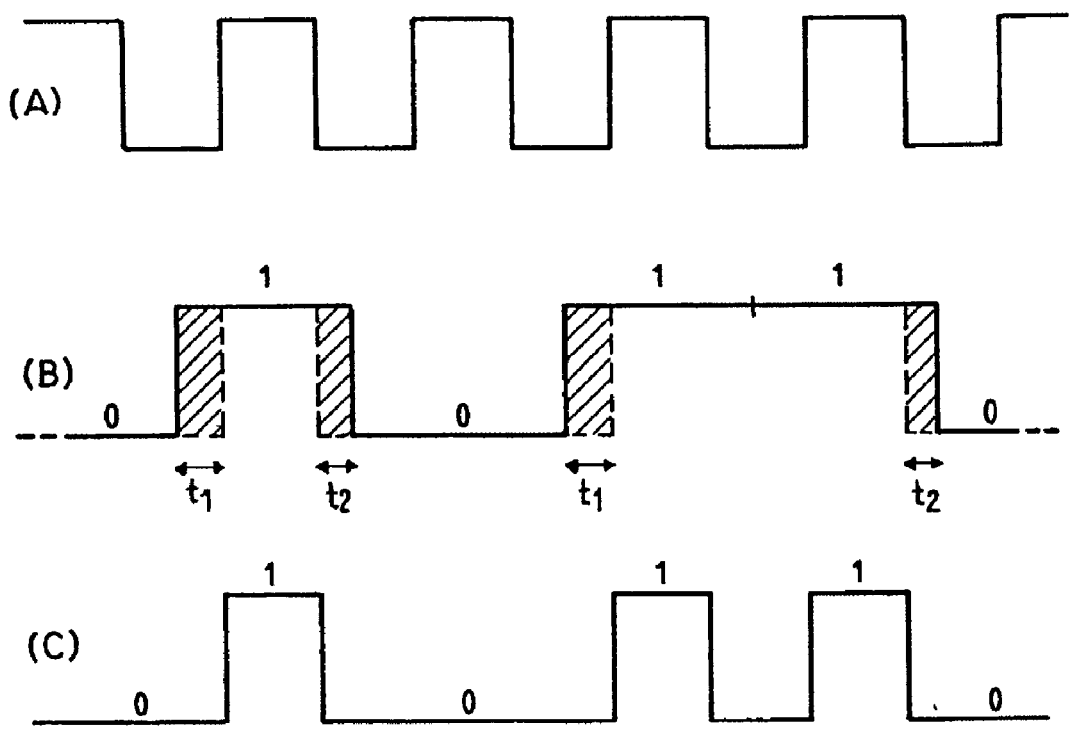

SIGNAL EMITTER FOR OPTICAL FIBERS

CROSS-REFERENCE TO RELATED APPLICATIONS

This application is based on French Patent Application No. 01 10 384 filed Aug. 2, 2001, the disclosure of which is hereby incorporated by reference thereto in its entirety, and the priority of which is hereby claimed under 35 U.S.C. §119.

BACKGROUND OF THE INVENTION

1. Field of the Invention

The present invention relates to a signal emitter for optical fibers.

To be more precise, the present invention concerns an emitter of optical signals for optical fibers including an electroabsorption modulator downstream of a laser.

2. Description of the Prior Art

Two types of modulator are conventionally used to convert electrical signals into optical signals travelling in an optical fiber: Mach-Zhender modulators and electroabsorption modulators.

Mach-Zhender modulators are fragile and bulky modulators using crystals and require high electrical power at a voltage from 7 to 10 volts.

Electroabsorption modulators are semiconductor modulators, are less fragile and more compact, and require less electrical power at a voltage from 2 to 2.5 volts.

However, the phenomenon known as optical "chirp" is relatively high in this latter type of modulator. It distorts the rising and falling edges of the pulses of the optical signals because of spurious frequencies. Thus electroabsorption modulators are usable only for transmission over short distances, for example for interfaces between equipment units or local telephone networks.

In particular, transient "chirp" leads to distortion of normally squarewave optical signals by the formation of positive and negative peaks at the rising and falling transitions, which spread the frequency spectrum and generate intersymbol interference giving rise to propagation transmission problems.

Also other optical signal pulse distortion phenomena are due to defects of the electronics supplying the signal.

Consequently, there occur:

The "jitter" phenomenon corresponding to translation with respect to time of the rising and falling edges of the pulses of the optical signals;

Distortion due to the rising and falling times of said edges, causing them to become curved; and A general asymmetry of the optical signals.

These distortions occur in all modulators but the "chirp" phenomenon is particularly serious in electroabsorption modulators.

The present invention solves the above problem by proposing a hybrid modulator eliminating these spurious phenomena from the optical signals and enabling them to be used for transfers over long distances.

SUMMARY OF THE INVENTION

The invention provides an emitter of optical signals for optical fibers, including an electroabsorption modulator downstream of a laser and a Mach-Zhender modulator downstream of the electroabsorption modulator and controlled by at least one clock to eliminate for each pulse of the resulting signal from the first modulator a portion of signal in a time range including the rising edge and in a time range including the falling edge.

This produces a signal of sufficient quality to propagate over long distances using relatively unsophisticated electronics.

Moreover, this signal is regenerated, which also contributes to its quality.

40 GHz signals can be modulated with high quality using the invention.

In a preferred embodiment of the invention, the electroabsorption modulator is NRZ modulated. The Mach-Zhender modulator is advantageously RZ modulated by the dedicated clock.

This results in a signal with bits of the same shape and with no intersymbol interference. At the receiver a low-pass filter filters the clock and performs the RZ to NRZ conversion, limiting the noise band.

The clock is preferably adjusted in the period of each pulse and can even be centered within that period.

The invention is described in more detail hereinafter with the aid of figures showing a preferred embodiment of the invention.

BRIEF DESCRIPTION OF THE DRAWINGS

FIG. 1 is a diagram representing an emitter according to the invention.

FIG. 2 represents optical signals obtained by means of the invention.

DETAILED DESCRIPTION OF THE PREFERRED EMBODIMENT

The hybrid emitter of optical signals for optical fibers conforming to the invention and shown in FIG. 1 includes, downstream of a laser 1, an electroabsorption modulator 2 and, downstream of the modulator 2, a Mach-Zhender modulator 3 controlled by at least one clock. In the example shown, the Mach-Zhender modulator 3 is a double-electrode modulator and consequently is controlled by two pilot circuits 7.

The optical fiber 8 at the output of the laser 1 therefore passes through the two modulators 2, 3 disposed in series.

The example shown relates to a 40 GHz signal and, in the conventional way, a multiplexer 5 receiving at its input four 10 GHz signals and controlled by a general clock 6 supplies a 40 Gbit/s electrical signal at the input of a pilot circuit 4. The pilot circuit 4 is advantageously an amplifier.

The general clock 6 also controls a pilot circuit 7 connected to each electrode of the Mach-Zhender modulator 3. The pilot circuit 7 includes an amplifier and a dedicated clock and is connected in a manner known to the person skilled in the art to an automatic gain controller 9. A delay line 10 provides temporal adjustment between the signal leaving the electroabsorption modulator and the dedicated clock entering the Mach-Zhender modulator 3.

The electroabsorption modulator 2 is NRZ modulated by the pilot circuit 4 and the Mach-Zhender modulator 3 is modulated by the "dedicated clock" pilot circuit 7 generating the RZ optical signal. The NRZ "1" bit allows the clock to pass and the NRZ "0" bit blocks the clock. Thus the clock signal is amplitude modulated by the NRZ signal.

The graph (A) in FIG. 2 represents the timing diagram of the dedicated clock constituting the pilot circuit of the Mach-Zhender modulator 3.

The graph (B) represents one example of the timing diagram of the optical signal obtained at the output of the electroabsorption modulator 2.

The signal at the output of the electroabsorption modulator 2 includes three bits of which two are adjacent. The shaded areas, which represent the areas of distortion of the rising and falling edges corresponding to the "chirp", "jitter", curvature and asymmetry phenomena referred to at the beginning of this description, are defined by experiment.

The optical output of the Mach-Zhender modulator 3 is RZ modulated leading to modulation in a manner that is known to the person skilled in the art of the preceding signal as three separate bits, as shown in the graph (C) in FIG. 2. The transitions of the optical signal generated are supplied by the dedicated clock of the Mach-Zhender modulator 3.

In accordance with the invention, the clock of the pilot circuit 7 eliminates for each resulting pulse or bit from the first modulator 2 a signal portion in a time range t1 including the rising edge and in a time range t2 including the falling edge. These two time ranges correspond to the shaded defective areas in the graph (A) and are equal because of the symmetry of the phenomena concerned.

For example, at 40 Gbit/s, the times t1, t2 each represent ¼ the bit period, i.e. 6.25 ps.

In other words, the emitted signal at the output of the Mach-Zhender modulator 3 is systematically between the defective areas.

To this end, the clock of the pilot circuit 7 is adjusted in the period of each pulse and is advantageously centered in said period, as shown.

The invention claimed is:

1. An emitter of optical signals for optical fibers, comprising:
   an electroabsorption modulator (EAM) downstream of a laser and providing an EAM output comprising a stream of pulses having leading and trailing edge portions, and
   a Mach-Zhender modulator downstream of said electroabsorption modulator and modulating said EAM output in accordance with at least one clock to eliminate said leading and trailing edges portions of each pulse.

2. The emitter claimed in claim 1, wherein the output of said electroabsorption modulator is a NRZ modulated signal.

3. The emitter claimed in claim 2, wherein the output of said Mach-Zhender modulator is a RZ modulated signal.

4. The emitter claimed in claim 3, wherein said at least one clock is adjusted so that each pulse of said at least one clock occurs in a period of each pulse of said EAM output representing one bit of data.

5. The emitter claimed in claim 4, wherein each pulse of said at least one clock is centered in said period.

6. The emitter claimed in claim 1, wherein said leading and trailing edge portions removed by said Mach-Zhender modulator are equal duration.

* * * * *